(12) United States Patent
Chole et al.

(10) Patent No.: US 9,965,211 B2
(45) Date of Patent: May 8, 2018

(54) DYNAMIC PACKET BUFFERS WITH CONSOLIDATION OF LOW UTILIZED MEMORY BANKS

(71) Applicant: Cisco Technology, Inc., San Jose, CA (US)

(72) Inventors: Sharad Vasantrao Chole, San Jose, CA (US); Shang-Tse Chuang, Los Altos, CA (US); Georges Akis, Los Altos, CA (US); Felice Bonardi, San Jose, CA (US); Rong Pan, Saratoga, CA (US)

(73) Assignee: Cisco Technology, Inc., San Jose, CA (US)

( * ) Notice: Subject to any disclaimer, the term of this patent is extended or adjusted under 35 U.S.C. 154(b) by 52 days.

(21) Appl. No.: 15/259,602

(22) Filed: Sep. 8, 2016

(65) Prior Publication Data

US 2018/0067683 A1    Mar. 8, 2018

(51) Int. Cl.
| | | |
|---|---|---|
| *G06F 3/00* | (2006.01) | |
| *G06F 3/06* | (2006.01) | |
| *G06F 12/1045* | (2016.01) | |
| *G06F 12/127* | (2016.01) | |
| *G06F 12/06* | (2006.01) | |

(52) U.S. Cl.
CPC ............ *G06F 3/0647* (2013.01); *G06F 3/067* (2013.01); *G06F 3/0613* (2013.01); *G06F 3/0644* (2013.01); *G06F 3/0656* (2013.01); *G06F 12/0623* (2013.01); *G06F 12/0692* (2013.01); *G06F 12/1045* (2013.01); *G06F 12/127* (2013.01)

(58) Field of Classification Search
CPC .... G06F 3/0613; G06F 3/0647; G06F 3/0644; G06F 3/0656; G06F 3/067; G06F 12/0623; G06F 12/0692; G06F 12/1045; G06F 12/127
USPC ........ 711/152, 156, 163, 166; 707/640, 654, 707/674, 737, 781, 802, 828; 710/14, 28, 710/36, 56, 120; 712/15, 225, 238, 248; 714/27, 710, 730, 773, 819
See application file for complete search history.

(56) References Cited

U.S. PATENT DOCUMENTS

| | | |
|---|---|---|
| 4,625,306 A | 11/1986 | Newman |
| 4,765,788 A | 8/1988 | Nowak et al. |
| 5,859,849 A | 1/1999 | Parks |

(Continued)

*Primary Examiner* — Reba I Elmore
(74) *Attorney, Agent, or Firm* — Edell, Shapiro & Finnan, LLC

(57) ABSTRACT

Provided are a method, a non-transitory computer-readable storage device and an apparatus for managing use of a shared memory buffer that is partitioned into multiple banks and that stores incoming data received at multiple inputs in accordance with a multi-slice architecture. A particular bank is allocated to a corresponding slice. Received respective data packets are associated with corresponding slices based on which respective inputs they are received. Determine, based on a state of the shared memory buffer, to transfer contents of all occupied cells of the particular bank. Writes to the bank are stopped, contents of occupied cells are transferred to cells of one or more other banks associated with the particular bank's slice, information is stored indicating where the contents have been transferred, and the particular bank is returned to a shared pool after transferring is completed.

20 Claims, 14 Drawing Sheets

(56) References Cited

U.S. PATENT DOCUMENTS

| | | | |
|---|---|---|---|
| 6,108,725 | A | 8/2000 | Chatter |
| 6,138,219 | A | 10/2000 | Soman et al. |
| 6,240,096 | B1 * | 5/2001 | Book .................. H04L 49/357 370/382 |
| 6,606,666 | B1 * | 8/2003 | Bell Jr. .................. H04L 47/10 370/230 |
| 6,643,256 | B1 | 11/2003 | Shimojo et al. |
| 6,754,205 | B1 | 6/2004 | Sakaue |
| 7,680,097 | B1 | 3/2010 | Goldstein et al. |
| 7,684,347 | B2 | 3/2010 | Merkey et al. |
| 7,830,793 | B2 | 11/2010 | Gai et al. |
| 7,996,485 | B2 | 8/2011 | Brown |
| 9,100,313 | B1 | 8/2015 | Mazzola et al. |
| 9,106,574 | B2 | 8/2015 | Newman et al. |
| 2002/0149989 | A1 | 10/2002 | Calvignac et al. |
| 2002/0181481 | A1 | 12/2002 | Iny |
| 2003/0123468 | A1 | 7/2003 | Nong |
| 2007/0011396 | A1 | 1/2007 | Singh et al. |
| 2007/0121499 | A1 * | 5/2007 | Pal ......................... H04L 45/60 370/230 |
| 2010/0232449 | A1 | 9/2010 | Nielsen |
| 2010/0318749 | A1 | 12/2010 | Matthews |
| 2010/0322003 | A1 * | 12/2010 | Doyle .................. G11C 7/1042 365/185.11 |
| 2012/0069848 | A1 * | 3/2012 | Mishra .................. H04L 49/30 370/392 |
| 2013/0329577 | A1 | 12/2013 | Suzuki et al. |
| 2014/0325153 | A1 * | 10/2014 | Huang ............... G06F 12/0607 711/122 |
| 2015/0278984 | A1 * | 10/2015 | Koker ...................... G06T 1/60 345/557 |

* cited by examiner

DYNAMIC PACKET BUFFERS WITH CONSOLIDATION OF LOW UTILIZED MEMORY BANKS

The present disclosure relates to dynamic buffer allocation and traffic flow through a network device of a network.

BACKGROUND

As link speeds and port densities increase exponentially for data center networks, it is difficult for a shared memory system to keep up with the aggregated system bandwidth. To cope with bandwidth demand, data center switches often adopt a multi-slice architecture in which each slice is responsible for buffering data from a subset of ports within a switch. Hence, the bandwidth requirement for each slice can be greatly reduced. The buffer memory is statically allocated among different slices. Although the scalability of such systems can be linear, it is limited by inter-slice communication and memory efficiency.

In a data center deployment, there is a high possibility of uneven buffer utilization. That is, not all of the slices will be equally occupied at the same time. Some slices might be running out of buffering space while other slices might have low buffer utilization. How to efficiently, but simply, use the buffer memory based on the slice-architecture is a challenging problem.

DESCRIPTION OF EXAMPLE EMBODIMENTS

Overview

Figure 1:
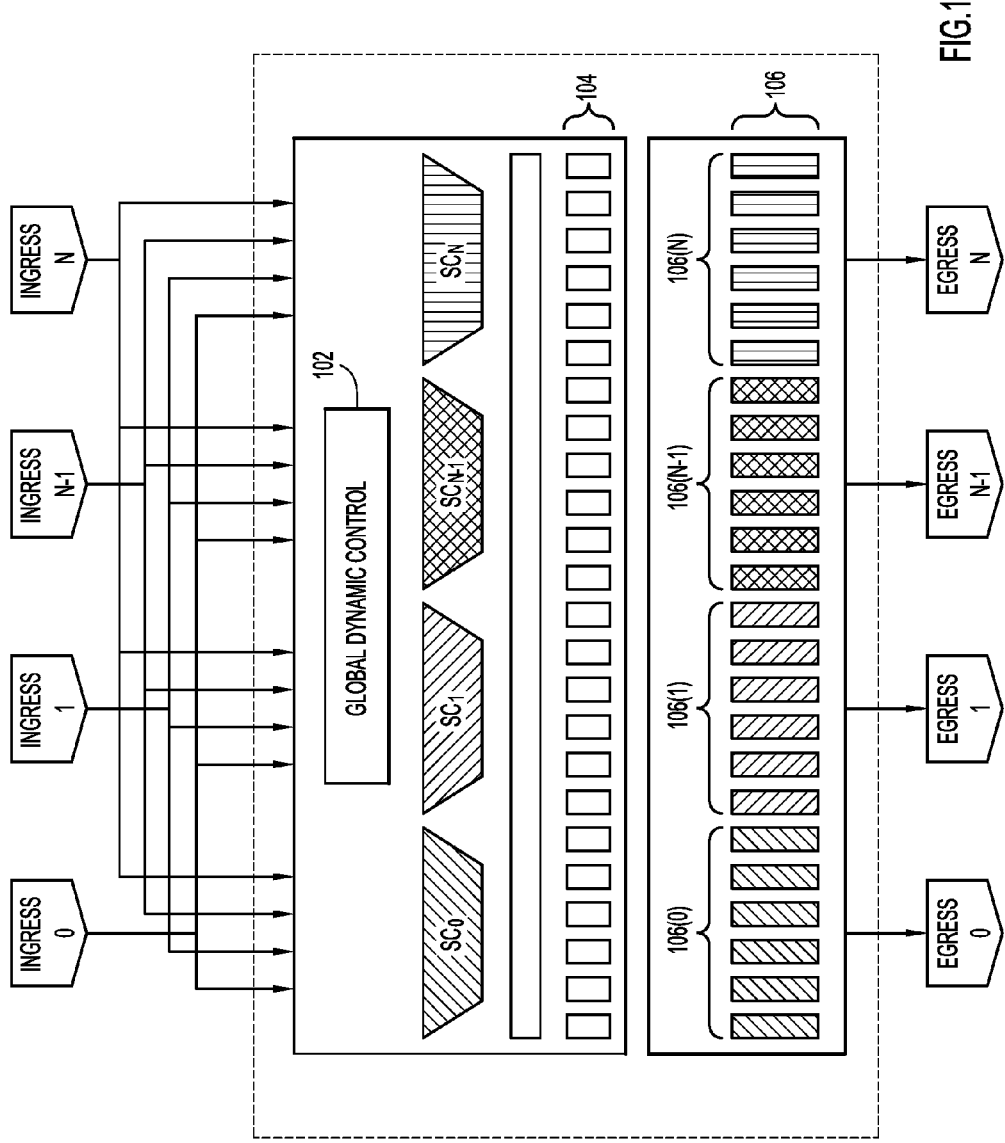
FIG. 1 shows a logical representation of slices and dynamically allocated buffers in a network device, according to an example embodiment.

In one embodiment, a method for managing use of a shared memory buffer that is partitioned into multiple banks and stores incoming data received at multiple inputs in accordance with a multi-slice architecture. Each of a number of slices is responsible for buffering data from a subset of the multiple inputs. Once a bank is allocated to a slice, other slices cannot read or write from the particular bank. One or more banks are allocated to a shared pool of banks that can be dynamically assigned to a slice. Data packets are received at the multiple inputs. To which of the slices respective data packets shall be written into is based on which subset of the multiple inputs the respective data packets are received. The respective data packets are written to respective banks according to their associated slices. When a particular bank has low buffer utilization, a process is invoked to combine its contents with other banks to empty the particular bank. A determination is made regarding when a particular bank assigned to a particular slice has an occupancy that is less than a first threshold, but is not empty. Writes to the particular bank are stopped and contents of all occupied cells of the particular bank are transferred to one or more other banks associated with the particular slice. Information is stored indicating locations to which the contents of the cells of the particular bank have been transferred. After all of the contents of the cells of the particular bank have been transferred, the particular bank is returned to the shared pool.

Example Embodiments

According to example embodiments presented herein, a network device is provided that has a shared memory buffer system which is carved into multiple banks, B, where B is larger than a number of slices, S. Each slice has certain pre-allocated, reserved banks and a remainder of the banks can be dynamically allocated to each slice. Once a bank is allocated to a slice, other slices cannot access it. A slice returns free dynamically allocated banks back to a shared pool, while keeping the reserved banks. In this way, the shared memory buffer system can be efficiently utilized.

The shared memory buffer is capable of supporting W writers and R readers. Due to an increase in bandwidth and limitations in buffer memory performance, the buffer is partitioned into B number of memory banks. Each bank can support $B_w$ writers and $B_r$ readers (note that $W > B_w$ and $R > B_r$).

A bank allocation manager may be responsible for assigning memory banks from a shared pool to an appropriate slice. Reading from the memory banks is deterministic in nature, i.e. once an output port requests a read from a memory bank, a response is guaranteed to occur with a fixed response delay. For this to be possible, a slice has exclusive ownership of a read port on selected banks. Because R>Br, a slice might not have read access to all of the memory banks.

When a packet arrives that is to be written into the shared memory buffer, a determination is made as to which slice the packet is assigned. The determination may be based on a subset of input ports on which the packet arrives. A memory allocation manager is responsible for taking a write operation and assigning a cell to a memory bank, which is owned by the corresponding slice. A row address of the written cell is given as output such that the cell may be retrieved at a future time. A given memory bank is not allowed to take the cell if it does not have enough free space. As a result, a write operation can be dropped if no memory banks allocated to the corresponding slice have enough free space.

When a slice has used up a certain percentage, u (where u may be 60%, or another percentage, of its reserved bank space), it would request a shared memory bank from the bank allocation manager. If the slice has not used up its maximum allowed number of memory banks and a free memory bank exists in the shared memory space, the bank allocation manager would grant the request. Otherwise, the bank allocation manager would deny the request.

When a slice has a free memory bank and its memory utilization for its other memory banks is less than u, the slice would release the free memory bank back to the shared pool.

Situations might arise where one slice might use multiple memory banks that are lightly occupied, but not empty. As a result, the shared memory system is running out of free memory banks while, in reality, there are many free memory spaces in the memory banks. Further, there can be a sudden shift of buffer requirements among slices. Waiting for a memory bank to become free by not allocating more cells of the memory bank might take a relatively long time. For example, 1% of cells remain 100 times longer than an average amount of time. Cell dequeue characteristics may fluctuate based on scheduling policies. Such conditions may cause starvation and backpressure if not carefully thought through.

A garbage collection process solves these problems by consolidating occupied cells of the lightly occupied memory banks into a smaller number of memory banks such that newly free memory banks can be released back to the shared pool. One challenge is consolidating the occupied cells into the memory banks while supporting line speed as output ports might try to read data from a bank that has been garbage-collected, or moved, to a different location. Before the bank allocation manager can reassign a memory bank from one slice to another or to the shared pool, a garbage collection manager determines whether the slice that currently owns the memory bank systematically transferred all of the occupied cells in that memory bank to one or more other memory banks that the slice currently owns. Because the occupied cells are transferred, a location associated with an original location which stored the cell, stores an address of the new location to which content of the cell was transferred.

A cell indirection manager is responsible for keeping track of where cells have been migrated or transferred. When a slice attempts to read a cell, the cell indirection manager determines an actual location where content of the cell is currently stored.

FIG. 1 illustrates an example network device 100 in which embodiments may be implemented. In some embodiments, network device 100 may be a switch. Ingress processes 0-N may receive input data packets from respective subsets of input ports and may write each respective input data packet to a respective cell in a corresponding memory bank owned by a particular slice.

Global dynamic control 102 monitors occupancy of memory banks owned by each slice and ensures that each slice has a proper allocation of memory banks. State memory 104 stores a state of corresponding cells in corresponding memory banks. Memory banks 106 are small portions of a shared memory buffer allocated to slices $SC_0$-$SC_N$. In some embodiments, each memory bank may have 2k bytes. Although, in other embodiments, each memory bank may have a different size. Further, each of the slices may be allocated a preset number of reserved memory banks. As an example, slice $SC_0$ may be assigned or allocated memory banks 106(0), slice $SC_1$ may be assigned or allocated memory banks 106(1), slice $SC_{N-1}$ may be assigned or allocated memory banks 106(N-1), and slice $SC_N$ may be assigned or allocated memory banks 106(N). A given number of memory banks may be dynamically allocated to the slices as needed.

Figure 2:
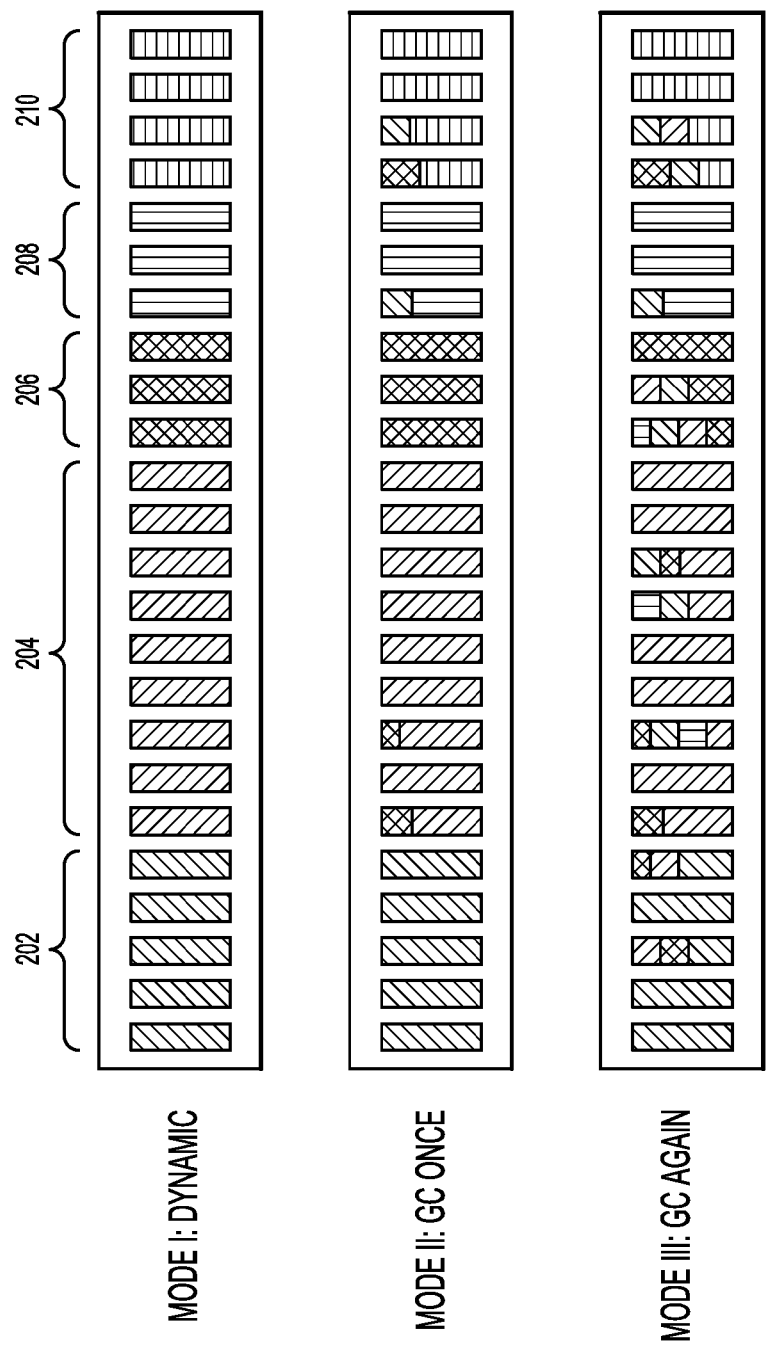
FIG. 2 illustrates memory buffer allocations to slices based on whether low utilized memory banks are not consolidated (referred to herein as a "garbage collection process"), consolidated once, or consolidated more than once, according to an example embodiment.

FIG. 2 illustrates memory buffer allocation resulting from three operating modes in accordance with embodiments presented herein. Mode I is a dynamic mode in which memory banks may be allocated to slices when memory utilization of memory banks owned by a slice is greater than a first threshold and the slice has fewer than a maximum number of memory banks allocated from a shared pool. As can be seen in FIG. 2, slices handling more traffic than other slices may be allocated a greater number of memory banks. Memory banks 202 are allocated to slice 0, memory banks 204 are allocated to slice 1, memory banks 206 are allocated to slice N-1, and memory banks 208 are allocated to slice N. Memory banks 210 may be allocated to another of the slices.

Mode II illustrates a state of the memory banks after garbage collection has been performed once. As shown in FIG. 2, some memory banks may have cells allocated to two different slices (one bank can only have cells from one bank, but the indirect manager might point to another location in a different bank). For example, two of the memory banks 204 have content from slice N-1, one of the memory banks 208 has content from slice 0 and two of the memory banks 210 have content from slice N-1 and slice 0, respectively.

Mode III illustrates a state of the memory banks after garbage collection has been performed more than once (one bank can only have cells from one bank, but the indirect manager might point to another location in a different bank.). As shown in FIG. 2, some memory banks have cells allocated to two or more different slices.

Figure 3:
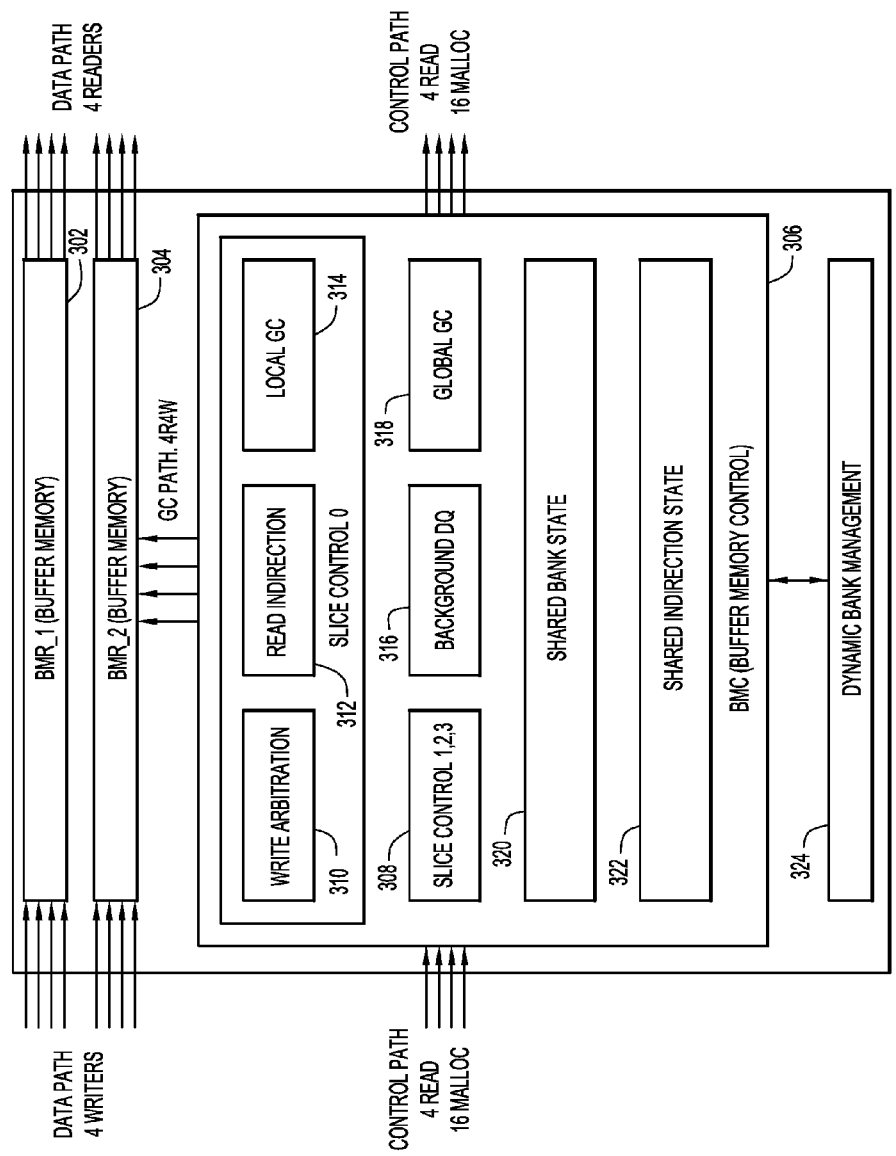
FIG. 3 show a block diagram of shared buffer memory management control, according to an example embodiment.

FIG. 3 illustrates a block diagram of shared buffer memory management control, in accordance with an example embodiment. Buffer memories 302, 304 illustrate actual shared buffer memory. In this embodiment, a respective ingress process in each of four slices may write data packets to cells in the memory banks allocated to any of the slices. There can only be one write to a bank at any moment in time. Consequently, writers are spread across banks belonging to a specific slice. An egress process of each slice may read the data packets stored in cells of memory banks allocated to a same slice as the egress process. Buffer memory control 306 includes slice control 308 for each of the slices. FIG. 3 shows a more detailed view only of slice control 0, which includes write arbitration 310, read indirection 312 and local garbage collection 314. Similar functional blocks are provided for slice control 1, slice control 2 and slice control 3.

Write arbitration 310 arbitrates write requests among banks owned by the specific slice. Write arbitration 310 outputs an address of a cell to which a data packet is written such that content of the cell may be read at a later time. Read indirection 312 is responsible for keeping track of a location in the shared buffer memory to which a cell has been transferred or moved as a result of the garbage collection process presented herein.

Local garbage collection (GC) 314 is responsible for consolidating occupied cells from lightly occupied memory banks of the specific slice.

Background DQ 316 performs a dequeue of a cell from a memory bank when a read has been read-indirected due to contents of the cell being transferred as a result of garbage collection.

Global GC 318 performs global tasks associated with garbage collection including, but not limited to, free bank selection from a shared pool, etc.

Shared bank state 320 keeps track of states of cells within the shared memory banks, for example, whether a cell is free, occupied, or redirected, etc.

Shared indirection state 322 stores indirection information such as an address at which content of a cell was transferred as a result of the garbage collection process presented herein.

Dynamic bank management 324 is responsible for communicating with memory controllers to check occupancy of memory banks allocated to slices to ensure that each slice is allocated its fair share of slices based on memory buffer occupancy. Dynamic bank management 324 is also responsible for starting garbage collection based on programmable thresholds.

The various blocks shown in FIG. 3 may be implemented by digital logic gates in any of a variety of forms, including in one or more application specific integrated circuit (ASICs), programmable digital logic, etc.

Figure 4:
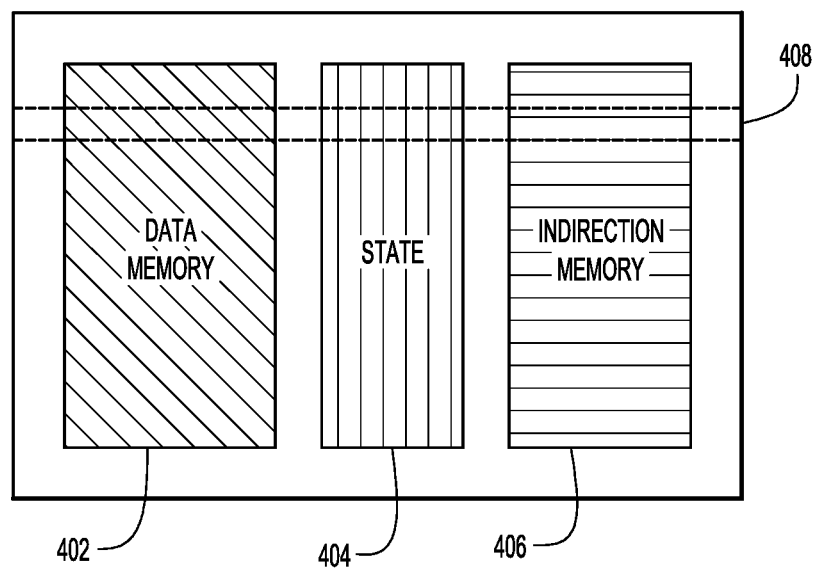
FIG. 4 illustrates an example of functional blocks of a memory bank to support the garbage collection process, according to an example embodiment.

FIG. 4 shows a logical view of a memory bank 400. Each memory bank is divided into three storage elements: a data memory 402; a state memory 404; and an indirection memory 406.

Data memory 402 is used for storing data for packets. Each row 408 of data memory 402 can hold a single or multiple cells. State memory 404 is used for storing respective states for specific locations. Each of the respective states represents a current status for a corresponding location. Indirection memory 406 is used for storing a pointer to a redirected address generated as a result of the garbage collection process. Redirection is performed when reading content from a cell that has been transferred to another cell in another memory bank as a result of the garbage collection process.

Figure 5:
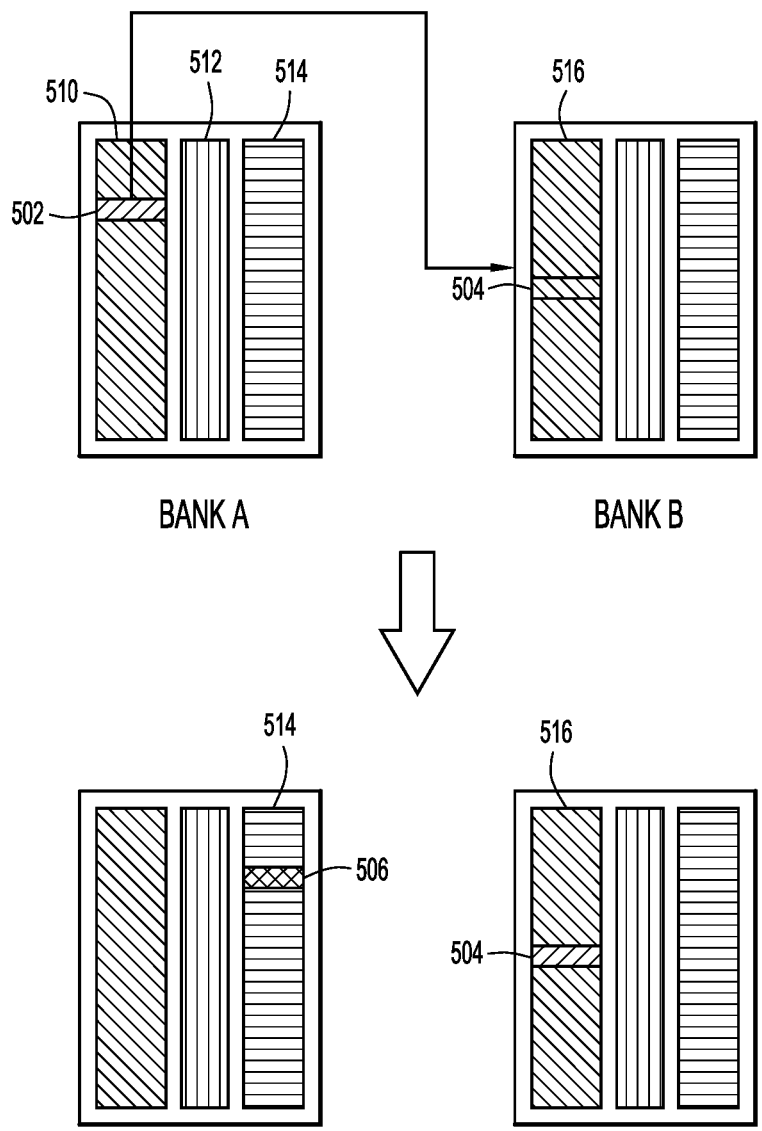
FIG. 5 illustrates the garbage collection process of transferring content of an occupied cell of a first memory bank to an available cell in a second memory bank allocated to a same slice as the first memory bank, according to an example embodiment.

FIG. 5 illustrates a process of transferring content of an occupied cell from a memory bank allocated to a slice to an available cell in a second memory bank allocated to the slice. As shown in FIG. 5, during garbage collection, content of occupied cell 502 in data memory 510 of memory bank A allocated to a slice is transferred to available cell 504 of data memory 516 of memory bank B, which is also allocated to that slice. A state of cell 502, in state memory 512 is updated to indicate that the content of cell 502 has been transferred. State memory 512 may indicate a state of a corresponding cell, which may include available, occupied, or redirected. An indirection pointer 506, in indirection memory 514 associated with data cell 502, is updated with a pointer to a location of data cell 504 in data memory 516 of memory bank B. When an attempt is made by an egress process to read data cell 502, read indirection 312 (FIG. 3) causes a read to occur from the address indicated by pointer 506, i.e., the address of cell 504 in memory bank B.

Figure 6:
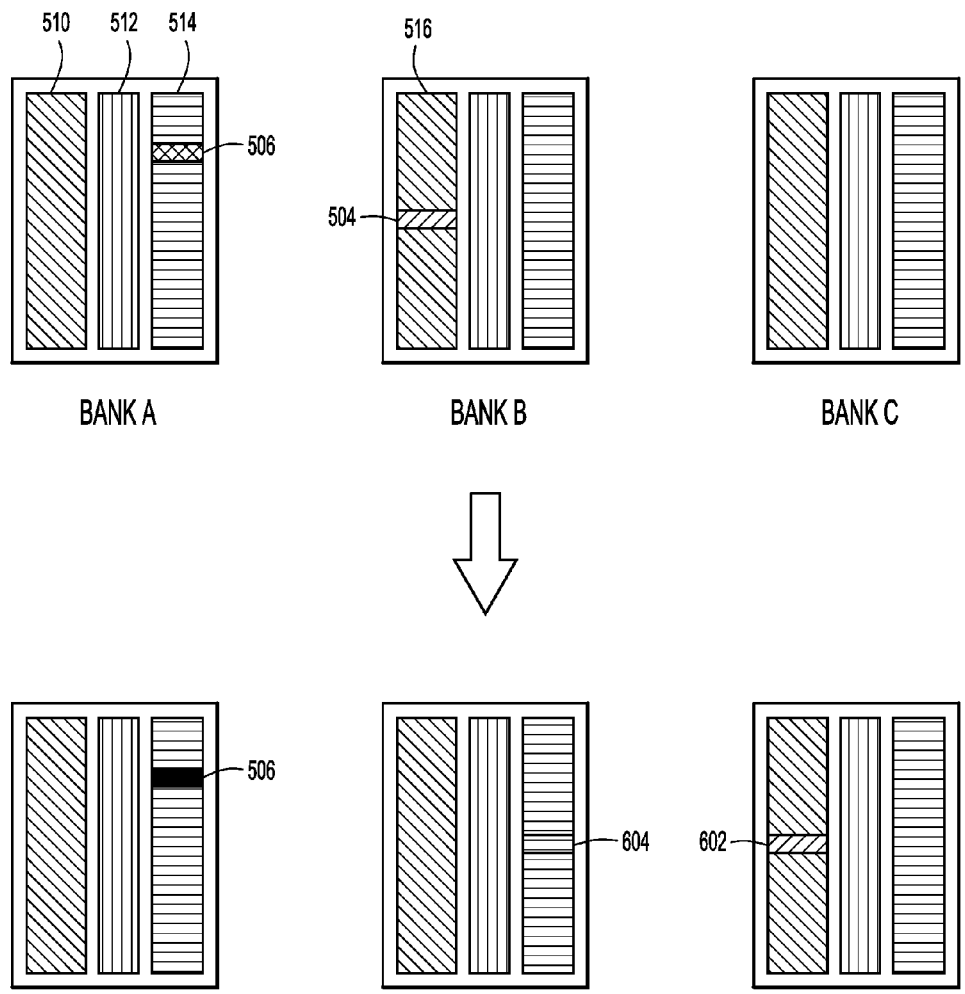
FIG. 6 illustrates another application of the garbage collection process by which content of a relocated cell is relocated again, according to an example embodiment.

FIG. 6 illustrates a process in which the transferred content in data cell 504 of memory bank B is moved again by the garbage collection process. In this example, the content of cell 504 is transferred to cell 602 in memory bank C allocated to a same slice as memory bank B. Indirection pointer 506 is then updated with a pointer to an address of cell 602.

In some embodiments, read indirection may be chained. With reference to FIG. 6, in such embodiments, when transferring the content of cell 504 to cell 602 in memory bank C, indirection pointer 604, corresponding to data cell 504 (the data cell to be transferred), may be updated with a pointer to the address of cell 602 (the destination data cell). Read indirection chaining may have multiple levels of chaining. However, as the level of indirection chaining increases, read latency also increases.

Figure 7:
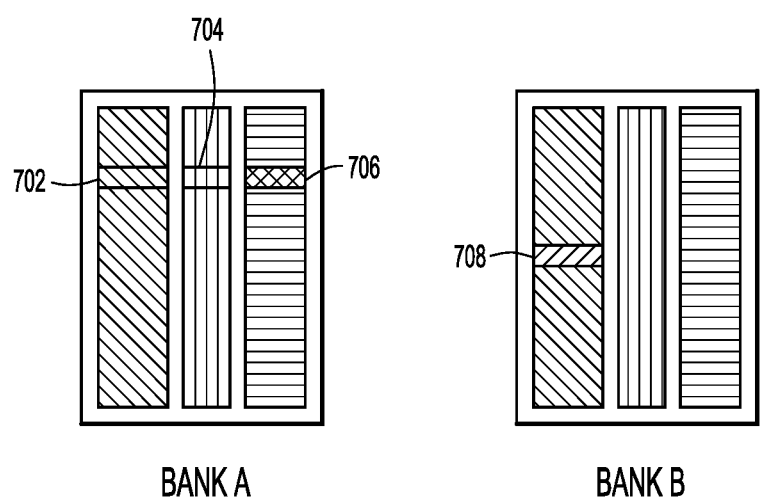
FIG. 7 shows an example process of reading a cell in a memory bank that has undergone garbage collection, according to an example embodiment.

FIG. 7 illustrates a read occurring on cell 702 of memory bank A. State memory 704 corresponding to cell 702 is checked to determine a state of cell 702. If the state is "occupied" then content of data cell 702 is read. If the state is "redirected" then indirection memory 706 is accessed to obtain redirection information regarding where the content of cell 702 has been relocated. In this example, indirection memory 706 includes a pointer to cell 708 in memory bank B, where the content of cell 702 has been relocated. Cell 708 may then be read.

The above-described embodiments use indirection memory to access content of cells that have been transferred. However, other embodiments may obtain indirection information using other methods. For example, a hash table may be used to store indirection information. A miss in the hash table could indicate that cell content is stored in its original location. As another example, ternary content-addressable memory (TCAM) may be used for storing and accessing small amounts of indirection information.

Figure 8:
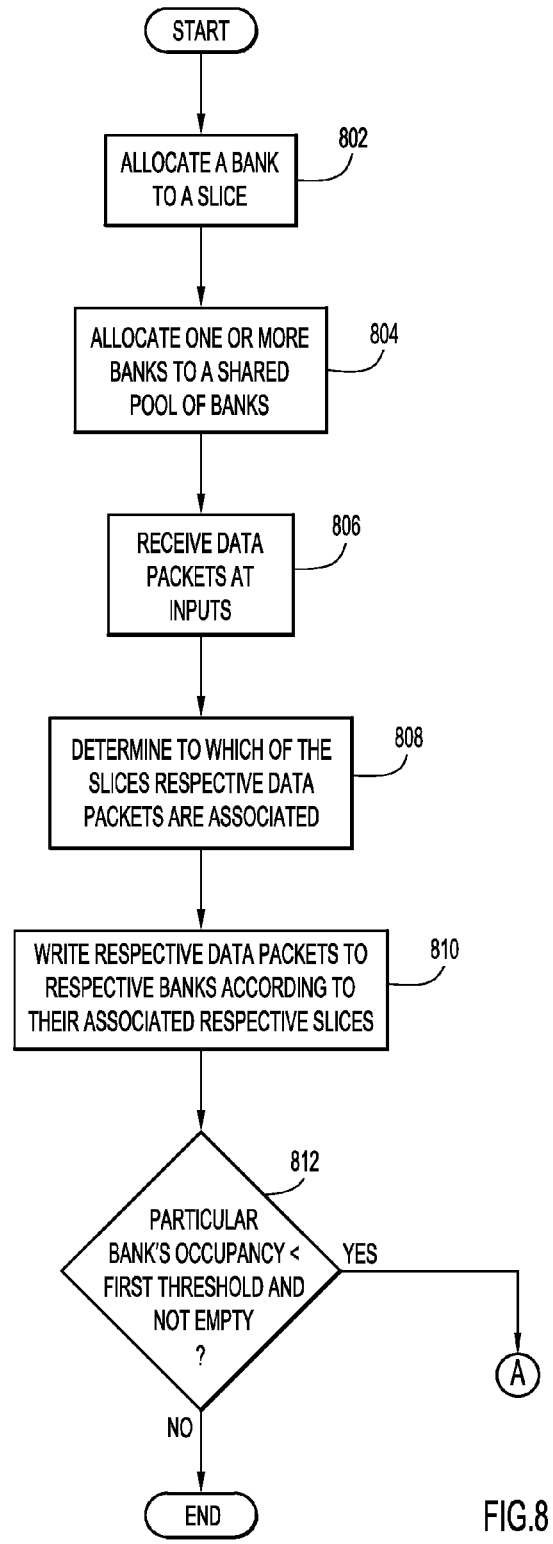
FIGS. 8 and 9 are flowcharts depicting, at a high-level, operations for writing to a cell and transferring content of a cell during the garbage collection process, according to an example embodiment.
Figure 9:
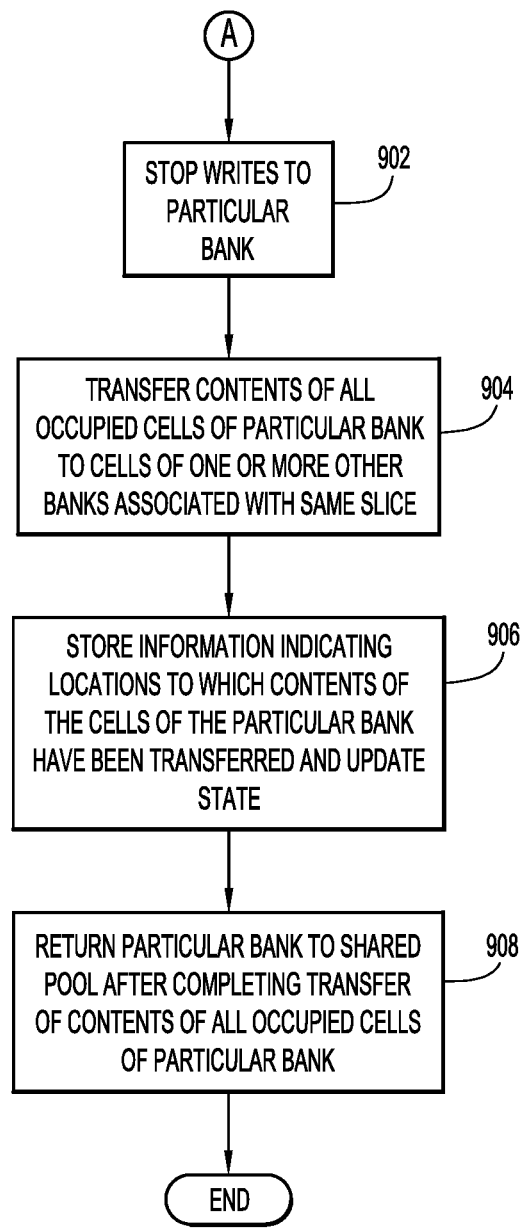

FIGS. 8 and 9 are flowcharts depicting, at a high-level, operations performed as part of write arbitration. The process begins at 802 by allocating a memory bank to a slice. At 804, one or more memory banks may be allocated to a shared pool of memory banks. Data packets may be received at input ports at 806. At 808, a determination is made regarding to which slice of a number of slices respective data packets are associated (based on the ports the respective packets are received). The determination at 808 may be based on which subset of input ports each data packet was received. At 810, a memory allocation manager may take respective write operations, and may assign corresponding cells to memory banks according to their associated respective slices such that the respective data packets may be written to the corresponding cells.

At 812, a determination may be made regarding whether each particular memory bank's occupancy is less than a first threshold and not empty. If a respective particular memory bank's occupancy is greater than or equal to the first threshold or the particular memory bank is empty, the process may be completed for that bank. In some embodiments, the first threshold is 30%. However, in other embodiments the first threshold may be some other value (higher or lower). In an alternate embodiment, the determination at 812 may be considered a function of bank occupancy, slice occupancy, total relocated cell count, free cell count, available shared banks etc. In other words, the determination at 812 may be based on various global measures of the packet buffer, but in general, is based on a state of the shared buffer. Otherwise, if the particular memory bank's occupancy is less than the first threshold and the particular memory bank is not empty, then writes to the particular memory bank may be stopped at 902 (FIG. 9). In some embodiments, this may be accomplished by taking the particular memory bank offline. Then, at 904 a garbage collection manager may transfer contents of all occupied cells of the particular memory bank to cells of one or more other memory banks that are associated with a same slice that is associated with the particular memory bank. At 906, information regarding respective locations to which the contents of the cells of the particular bank have been transferred may be stored in corresponding locations in indirection memory of the particular memory bank and respective states in state memory of the occupied cells of the particular memory bank may be set to a value indicating that the corresponding cell has been transferred. The particular memory bank may be returned to a shared pool after the garbage collection manager determines that the contents of all occupied cells of the particular memory bank have been transferred, at 908.

Figure 10:
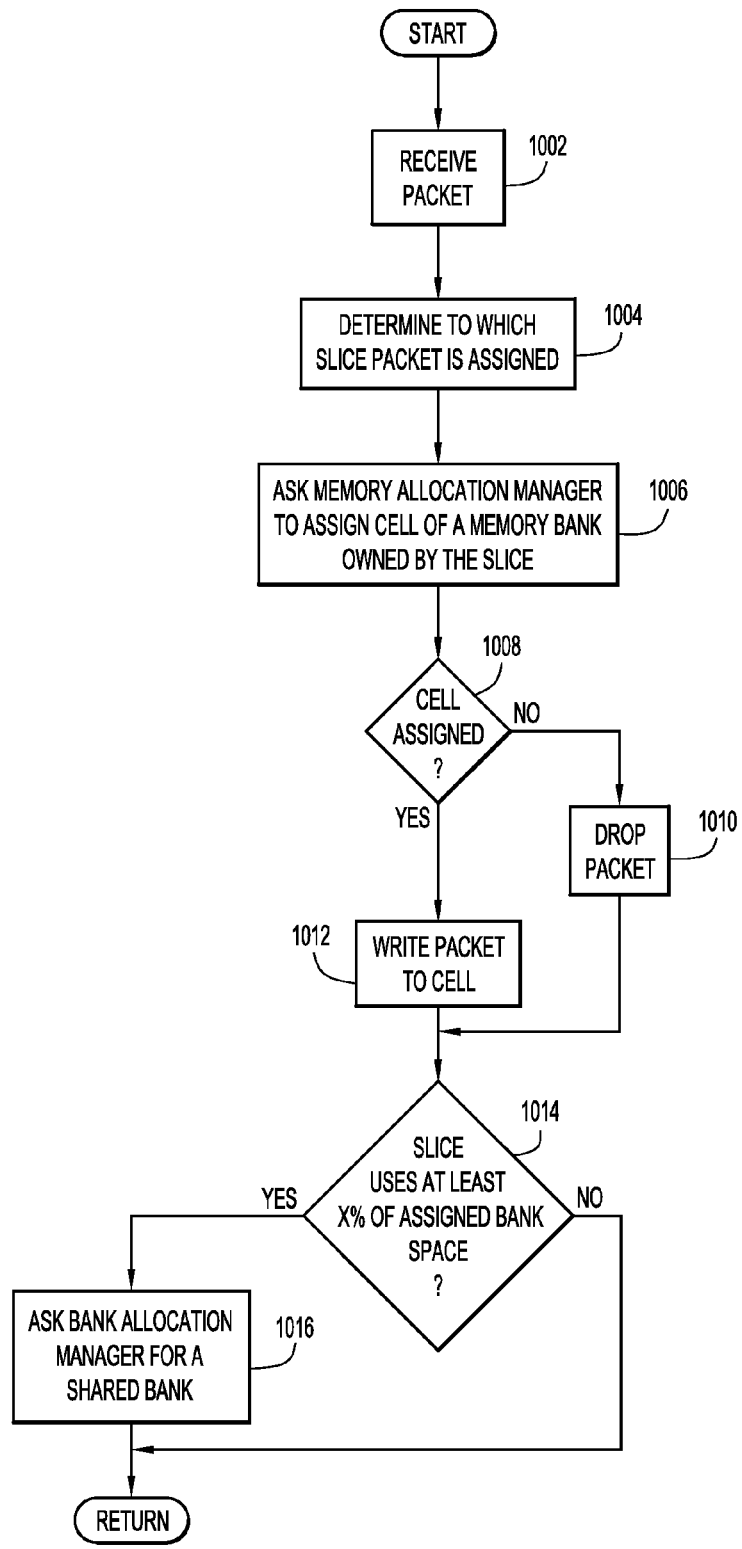
FIGS. 10-12 are flowcharts depicting in more detail, operations of the garbage collection process, according to example embodiments.

FIG. 10 illustrates more detailed processing which may occur in various embodiments when a data packet is received via an input port. The process may begin with receiving a data packet, at 1002. A determination may be made regarding to which slice the data packet is assigned, at 1004. This may be determined based on a subset of a number of subsets of the input ports on which the data packet was received.

Next, a memory allocation manager may be requested to assign a cell of a memory bank owned by, or allocated to, the slice, at 1006.

Figure 11:
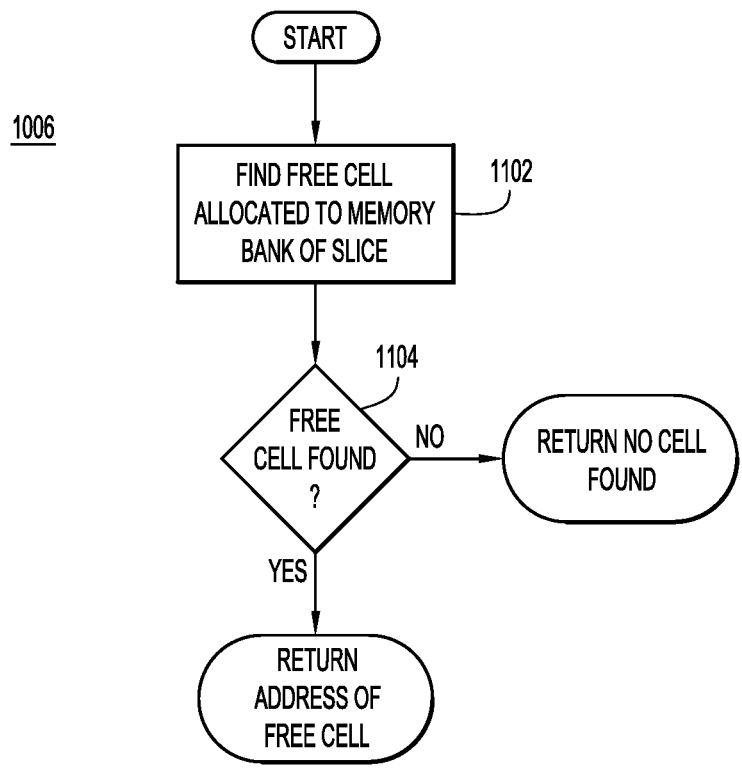

FIG. 11 illustrates an example process that may be performed during operation 1006. The process may begin with the memory allocation manager attempting to find a free cell of a memory bank allocated to the slice, at 1102). A determination may be made regarding whether the free cell was found, at 1104. If no free cell was found, then an indication may be returned indicating that no cell was found. Otherwise, an indication may be returned indicating that the free cell was found.

Returning back to FIG. 10, a determination may be made regarding whether the cell was successfully found and assigned, at 1008. If the cell was not successfully assigned, then at 1010 the data packet may be dropped. Otherwise, the address of the assigned cell may be returned by the memory allocation manager and the data packet may be written to the cell, at 1012.

A determination may then be made whether the slice uses at least a particular percentage of space in the memory banks allocated to the slice, at 1014. In some embodiments, the particular percentage may be 70%. In other embodiments, the particular percentage may be another value. In an alternate embodiment, at 1014, the particular percentage may be based on a curve, which is further based on a number of shared memory banks that are already allocated to the slice. If the slice uses at least the particular percentage of space in the memory banks allocated to it, then at 1016, a request may be made to a bank allocation manager for a shared memory bank to be allocated from a shared pool to the slice.

Figure 12:
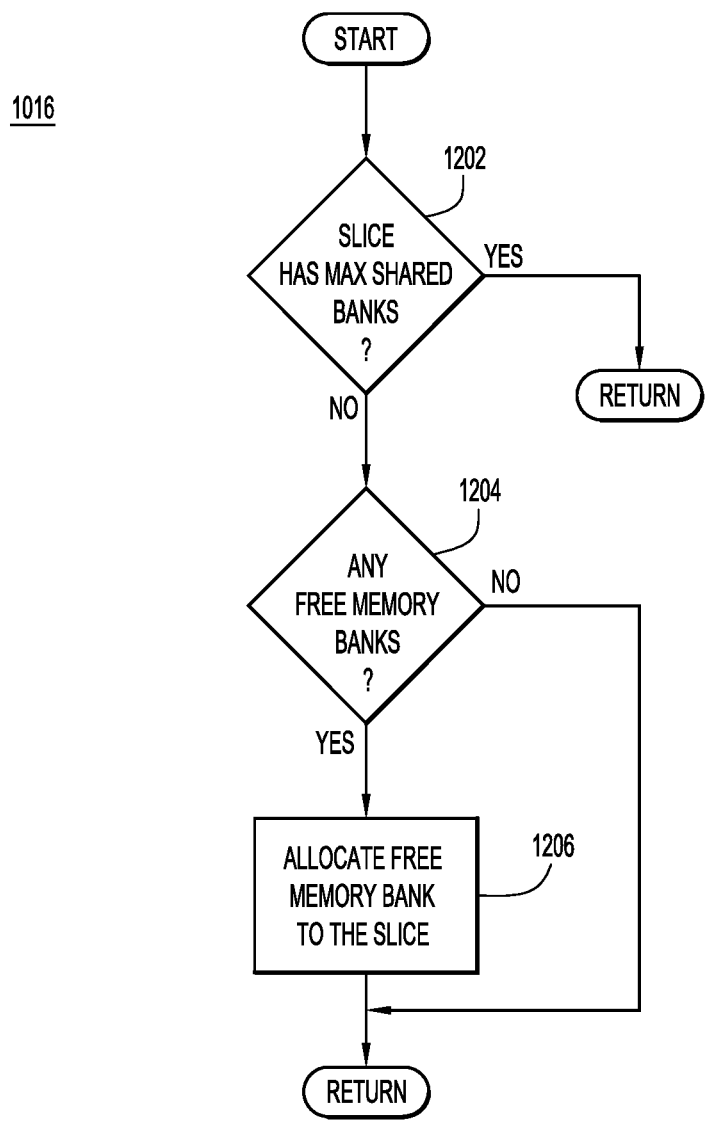

FIG. 12 shows example processing performed during operation 1016 of FIG. 10. A determination may be made regarding whether the slice already has allocated to it a maximum number of shared memory banks from a shared pool, at 1202. If the slice already has the maximum number of shared memory banks allocated to it, then the processing is completed. Otherwise, a determination may be made regarding whether there are any free shared memory banks in the shared pool, at 1204. If there are no free shared memory banks in the shared pool, then processing is completed. If, at 1204, the determination is made that a free shared memory bank exists in the shared pool, then the free shared memory bank may be allocated to the slice, at 1206, and the process is completed.

Returning again to FIG. 10, if during operation 1014 a determination is made that the slice does not use at least the particular percentage of allocated memory bank space, then the process is completed.

Figure 13:
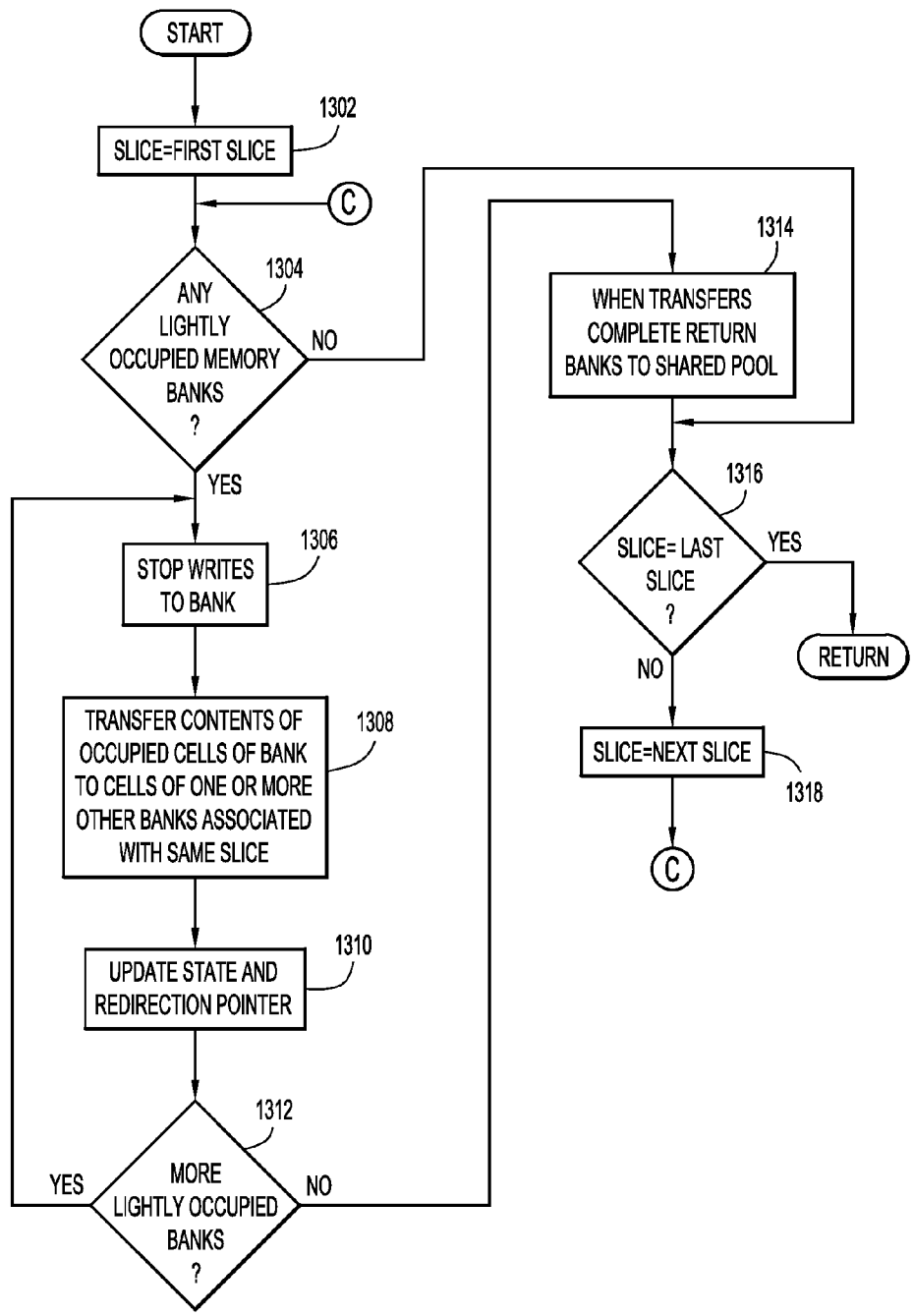
FIG. 13 is a flowchart of garbage collection operations that may be performed, according to example embodiments.

FIG. 13 is a flowchart that illustrates example processing that may be performed by a garbage collection manager in various embodiments. The process may be performed periodically such as, for example, every two minutes, every five minutes, or another time interval.

The process may begin with preparing to examine memory banks of a first slice, at 1302. A determination may be made regarding whether any memory banks allocated to the slice are lightly occupied, at 1304. One can view this as a generic cost function on available free cells in a given memory bank. A lightly occupied memory bank may be a memory bank that is less than X % occupied, but not empty, where X % may be 30% in some embodiments. In other embodiments, X may be different value.

In alternate embodiments, a lightly occupied memory bank may be a memory bank that is more than Y % occupied and less than X % occupied, where Y<X. In some alternate embodiments, Y % may be 20% and X % may be 40%. In other alternate embodiments, Y and X may have other values.

If a lightly occupied memory bank allocated to the slice is found, then writes to the bank are stopped, at 1306. In some embodiments, the writes to the bank are stopped by taking the bank offline. Next, at 1308, contents of the occupied cells of the bank are transferred to cells of one or more other banks associated with the slice. A state and a redirection pointer associated with respective contents of each of the occupied cells may be updated, at 1310. The state may be updated to indicate that a respective cell has been relocated and the redirection pointer may include a pointer to a cell to which the content has been transferred.

A determination may then be made regarding whether there are any additional lightly occupied banks allocated to the slice, at 1312. If no additional lightly occupied banks allocated to the slice exist, then when transfers are completed, the garbage collection manager returns to a shared pool any banks from which transfers were made, at 1314. A determination may then be made regarding whether garbage collection for the last slice has been performed, at 1316. If processing for the last slice has been performed, then the process is completed. Otherwise, the garbage collection manager prepares to examine memory buffers of a next slice, at 1318 and operations 1304-1312 may be repeated.

If, during operation 1312, an additional lightly occupied bank is found, then operations 1306-1312 may be repeated.

If, during operation 1304, no lightly occupied memory banks allocated to the slice are found, then control may pass to operation 1316 to determine whether garbage collection for a last slice has been performed.

Figure 14:
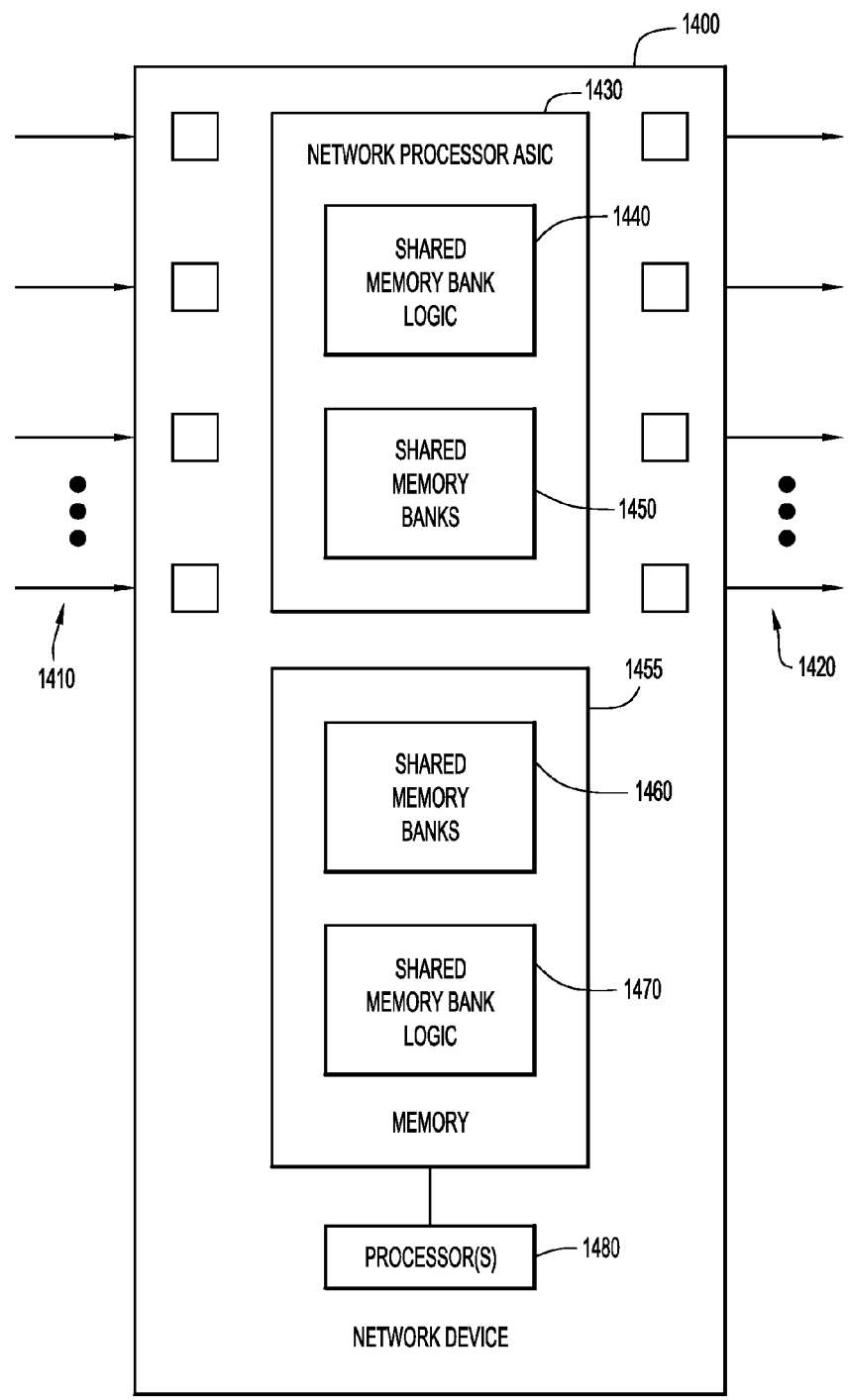
FIG. 14 shows an example of a network device configured to perform the garbage collection techniques, according to an example embodiment.

FIG. 14 illustrates a network device 1500 that may be configured to perform the garbage collection techniques presented herein, according to an example embodiment. Network device 1400 may have a first number of input ports 1410 and a second number of output ports 1420. In one embodiment, the network device 1400 includes a network processor ASIC 1430, or multiple such ASICs. Network processor ASIC 1430 may include fixed digital logic, programmable logic, or a combination thereof. For example, network processor ASIC 1430 may include fixed or programmable digital logic integrated circuits, in which digital logic gates are configured to perform instructions of shared memory bank management logic 1440. Network processor ASIC 1430 may further include memory and fixed or programmable digital logic for shared memory buffers 1450, as well as digital logic for networking functions, such as switching, routing, etc.

Network device 1400 may include network processor ASIC 1430 or memory 1555 or both network processor ASIC 1430 and memory 1455. Network device 1400 may further include one or more processors 1480. Memory 1455 may include a number of shared memory buffers 1460 as well as shared memory bank management logic 1470.

The one or more processors 1480 may be one or more microprocessors or programmable microcontrollers configured to execute program logic instructions such as shared memory bank logic 1470 for carrying out various operations and tasks described herein. For example, one or more processors 1480 can execute shared memory bank logic 1470 stored in memory 1455 (for example, software) in order to perform shared memory bank dynamic allocation techniques described herein. Memory 1455 may include read only memory (ROM), random access memory (RAM), magnetic storage media, optical storage media, flash memory, electrical, or other physical/tangible (non-transitory) memory.

The functions of one or more processors 1480 may be implemented by logic encoded in one or more non-transitory tangible computer readable media, wherein memory 1455 may store data used for operations described herein and may store software or processor executable instructions that are executed to carry out the operations described herein.

Shared memory bank logic 1470 may take any of a variety of forms, so as to be encoded in one or more non-transitory tangible computer readable memory media or storage device (such as memory 1455) for execution, such as fixed logic or programmable logic (such as software/computer instructions executed by a processor).

The above-described embodiments are bank based. In some embodiments there may be restrictions on which banks can be garbage collected. For example, public banks vs. private banks. Further restrictions may include, but not be limited to, a number of times content of data cells may be collected, and whether the content of data cells can be relocated from an original location or a relocated location.

In some embodiments, garbage collection may be performed with respect to a region instead of a bank. A region can be defined as a set of banks. A scratch pad memory may be used to relocate the occupied cells of a region.

Embodiments of dynamic packet allocation with garbage collection have a number of advantages. For example, higher memory bank occupancy, as compared to a static buffer allocation approach, can be achieved because only needed memory banks are used. Bank switching time remains independent of packet "stickiness" or scheduling policies. Use of garbage collection makes it possible to give firm guarantees on an amount of time in which a bank can be made free and given to another slice in need. A management module may observe states of buffers across all slices and may adapt easily to current traffic patterns. Bank allocation, thresholds, policies, algorithms, etc. may be controlled through a software interface. Unused banks in a shared pool may be turned off, thus reducing power consumption. In addition, overhead regarding a communication cross-bar between ingress and egress processes is eliminated.

In summary, in one form, a method is provided for managing use of a shared memory buffer that is partitioned into a plurality of banks and that stores incoming data received at a plurality of inputs in accordance with a multi-slice architecture, wherein each of a plurality of slices is responsible for buffering data from a subset of the plurality of inputs, the method comprising: allocating a bank of the plurality of banks to a corresponding slice such that once a particular bank is allocated to a slice, other slices cannot read from the particular bank; determining which of the plurality of slices to which respective data packets are associated based on which of the plurality of inputs the respective data packets are received; writing the respective data packets to respective banks of the plurality of banks according to their associated respective slices; determining, based on a state of the shared memory buffer, to transfer contents of all occupied cells of the particular bank; stopping further writes to the particular bank; transferring contents of all occupied cells of the particular bank to cells of one or more other banks associated with the particular slice; storing information indicating locations to which the contents of the cells of the particular bank have been transferred; and returning the particular bank to the shared pool after performing the transferring.

In another form, an apparatus is provided for managing use of a shared memory buffer that is partitioned into a plurality of banks and that stores incoming data received at a plurality of inputs in accordance with a multi-slice architecture, wherein each of a plurality of slices is responsible for buffering data from a subset of the plurality of inputs, the apparatus comprising: a plurality of ports at which packets are received; and processor or an application specific integrated circuit configured to: allocate a bank of the plurality of banks to a corresponding slice such that once a particular bank is allocated to a slice, other slices cannot read from the particular bank; determine which of the plurality of slices to which respective data packets are associated based on which of the plurality of inputs the respective data packets are received; write the respective data packets to respective banks of the plurality of banks according to their associated respective slices; determine, based on a state of the shared memory buffer, to transfer contents of all occupied cells of the particular bank; stop further writes to the particular bank; transfer contents of all occupied cells of the particular bank to cells of one or more other banks associated with the particular slice; store information indicating locations to which the contents of the cells of the particular bank have been transferred; and return the particular bank to the shared pool after contents of the cells of the particular bank of memory have been transferred.

In still another form, a non-transitory computer-readable storage medium is provided having instructions stored therein for at least one processor to manage use of a shared memory buffer that is partitioned into a plurality of banks and stores incoming data received at a plurality of inputs in accordance with a multi-slice architecture, wherein each of a plurality of slices is responsible for buffering data from a subset of the plurality of inputs, when the at least one processor executes the instructions to perform operations comprising: allocating a bank of the plurality of banks to a corresponding slice such that once a particular bank is allocated to a slice, other slices cannot read from the particular bank; determining which of the plurality of slices to which respective data packets are associated based on which of the plurality of inputs the respective data packets are received; writing the respective data packets to respective banks of the plurality of banks according to their associated respective slices; determining, based on a state of the shared memory buffer, to transfer contents of all occupied cells of the particular bank; stopping further writes to the particular bank; transferring contents of all occupied cells of the particular bank to cells of one or more other banks associated with the particular slice; storing information indicating locations to which the contents of the cells of the particular bank have been transferred; and returning the particular bank to the shared pool after contents of the cells of the particular bank of memory have been transferred.

Although the method, system, and one or more computer readable storage media are illustrated and described herein as embodied in one or more specific examples, it is nevertheless not intended to be limited to the details shown, since various modifications and structural changes may be made therein without departing from the scope of the system, the method, and the one or more volatile and/or non-volatile computer readable storage media and within the scope and range of equivalents of the claims. Accordingly, it is appropriate that the appended claims be construed broadly and in a manner consistent with the scope of the system, the method, and the one or more computer readable storage media, as set forth in the following.

What is claimed is:

1. A method for managing use of a shared memory buffer that is partitioned into a plurality of banks and that stores incoming data received at a plurality of inputs in accordance with a multi-slice architecture, wherein each of a plurality of slices is responsible for buffering data from a subset of the plurality of inputs, the method comprising:
    allocating a bank of the plurality of banks to a corresponding slice such that once a particular bank is allocated to a slice, other slices cannot read from the particular bank;
    determining which of the plurality of slices to which respective data packets are associated based on which of the plurality of inputs the respective data packets are received;
    writing the respective data packets to respective banks of the plurality of banks according to their associated respective slices;
    determining, based on a state of the shared memory buffer, to transfer contents of all occupied cells of the particular bank;
    stopping further writes to the particular bank;
    transferring contents of all occupied cells of the particular bank to cells of one or more other banks associated with the particular slice;
    storing information indicating locations to which the contents of the cells of the particular bank have been transferred; and
    returning the particular bank to the shared pool after performing the transferring.

2. The method of claim 1, further comprising redirecting read requests to the particular bank to locations of cells in the one or more other banks to which the content has been transferred based on the stored information.

3. The method of claim 2, wherein storing comprises storing pointers to respective redirected addresses of cells to which the contents of cells in the particular bank have been moved.

4. The method of claim 3, further comprising storing information indicating whether a location of a bank is available, occupied, or redirected.

5. The method of claim 1, wherein determining to transfer contents is based on a function of at least one of: bank occupancy, slice occupancy, total relocated cell count, free cell count or available shared banks, of the shared memory buffer.

6. The method of claim 1, further comprising:
    transferring transferred content of one of the cells of one of the one or more other banks to a cell of a second other bank associated with the particular slice; and
    storing second information indicating a location to which the transferred content of the one of the cells has been transferred.

7. The method of claim 6, wherein storing second information further comprises storing a pointer to a redirected address of the cell to which the content of the one of the cells has been transferred.

8. The method of claim 7, wherein storing second information further comprises storing the pointer to the redirected address at a location associated with an original location of the transferred content at a cell of the particular bank.

9. An apparatus for managing use of a shared memory buffer that is partitioned into a plurality of banks and that stores incoming data received at a plurality of inputs in accordance with a multi-slice architecture, wherein each of a plurality of slices is responsible for buffering data from a subset of the plurality of inputs, the apparatus comprising:
    a plurality of ports at which packets are received; and
    a processor or an application specific integrated circuit configured to:
        allocate a bank of the plurality of banks to a corresponding slice such that once a particular bank is allocated to a slice, other slices cannot read from the particular bank;
        determine which of the plurality of slices to which respective data packets are associated based on which of the plurality of inputs the respective data packets are received;
        write the respective data packets to respective banks of the plurality of banks according to their associated respective slices;
        determine, based on a state of the shared memory buffer, to transfer contents of all occupied cells of the particular bank;
        stop further writes to the particular bank;
        transfer contents of all occupied cells of the particular bank to cells of one or more other banks associated with the particular slice;
        store information indicating locations to which the contents of the cells of the particular bank have been transferred; and
        return the particular bank to the shared pool after contents of the cells of the particular bank of memory have been transferred.

10. The apparatus of claim 9, wherein the processor or the application specific integrated circuit is further configured to redirect read requests to the particular bank to locations of cells in the one or more other banks to which the content has been transferred based on the stored information.

11. The apparatus of claim 10, wherein the processor or the application specific integrated circuit is further configured to store pointers to respective redirected addresses of cells to which the contents of cells in the particular bank have been moved.

12. The apparatus of claim 11, wherein the processor or the application specific integrated circuit is further configured to store information indicating whether a location of a bank is available, occupied, or redirected.

13. The apparatus of claim 9, wherein the processor or the application specific integrated circuit is further configured to:
    transfer transferred content of one of the cells of one of the one or more other banks to a cell of a second other bank associated with the particular slice; and
    store second information indicating a location to which the transferred content of the one of the cells has been transferred.

14. The apparatus of claim 13, wherein the processor or the application specific integrated circuit is configured to store a pointer to a redirected address of the cell to which the content of the one of the cells has been transferred.

15. The apparatus of claim 13, wherein the processor or the application specific integrated circuit is configured to determine to transfer contents based on a function of at least one of: bank occupancy, slice occupancy, total relocated cell count, free cell count or available shared banks, of the shared memory buffer.

16. A non-transitory computer-readable storage medium having instructions stored therein for at least one processor to manage use of a shared memory buffer that is partitioned into a plurality of banks and stores incoming data received at a plurality of inputs in accordance with a multi-slice architecture, wherein each of a plurality of slices is responsible for buffering data from a subset of the plurality of inputs, wherein the at least one processor executes the instructions to perform operations comprising:
    allocating a bank of the plurality of banks to a corresponding slice such that once a particular bank is allocated to a slice, other slices cannot read from the particular bank;
    determining which of the plurality of slices to which respective data packets are associated based on which of the plurality of inputs the respective data packets are received;
    writing the respective data packets to respective banks of the plurality of banks according to their associated respective slices;
    determining, based on a state of the shared memory buffer, to transfer contents of all occupied cells of the particular bank;
    stopping further writes to the particular bank;
    transferring contents of all occupied cells of the particular bank to cells of one or more other banks associated with the particular slice;
    storing information indicating locations to which the contents of the cells of the particular bank have been transferred; and
    returning the particular bank to the shared pool after contents of the cells of the particular bank of memory have been transferred.

17. The non-transitory computer-readable storage medium of claim 16, further comprising instructions operable for redirecting read requests to the particular bank to locations of cells in the one or more other banks to which the content has been transferred based on the stored information.

18. The non-transitory computer-readable storage medium of claim 17, wherein the instructions operable for storing comprise instructions operable for storing pointers to respective redirected addresses of cells to which the contents of cells in the particular bank have been moved.

19. The non-transitory computer-readable storage medium of claim 18, further comprising instructions operable for storing information indicating whether a location of a bank is available, occupied, or redirected.

20. The non-transitory computer-readable storage medium of claim 16, further comprising instructions operable for:
    transferring the transferred content of one of the cells of one of the one or more other banks to a cell of a second other bank associated with the particular slice; and
    storing second information indicating a location to which the transferred content of the one of the cells has been transferred.

* * * * *